(12) United States Patent
Durner et al.

(10) Patent No.: US 7,576,919 B2
(45) Date of Patent: Aug. 18, 2009

(54) ELECTRONIC SPECTACLES, IN PARTICULAR NIGHT VISION SPECTACLES

(76) Inventors: Andreas Durner, Baumenheimer Strasse 28, Donauworth (DE) 86609; Andre Draheim, Krautengartenweg 1, Donauworth (DE) 86609

( * ) Notice: Subject to any disclaimer, the term of this patent is extended or adjusted under 35 U.S.C. 154(b) by 128 days.

(21) Appl. No.: 10/581,406

(22) PCT Filed: Nov. 30, 2004

(86) PCT No.: PCT/EP2004/013581

§ 371 (c)(1), (2), (4) Date: Nov. 1, 2006

(87) PCT Pub. No.: WO2005/054925

PCT Pub. Date: Jun. 16, 2005

(65) Prior Publication Data

US 2007/0091448 A1 Apr. 26, 2007

(30) Foreign Application Priority Data

Dec. 1, 2003 (DE) ................................ 103 56 024

(51) Int. Cl.
*G02B 27/14* (2006.01)

(52) U.S. Cl. ...................................... 359/630; 351/158
(58) Field of Classification Search .................. 351/41, 351/158, 200, 209, 210; 359/630
See application file for complete search history.

(56) References Cited

U.S. PATENT DOCUMENTS 6,008,779 A * 12/1999 Ellis .............................. 345/8
6,091,546 A * 7/2000 Spitzer ........................ 359/618

* cited by examiner

*Primary Examiner*—Huy K Mai
(74) *Attorney, Agent, or Firm*—Woodling, Krost and Rust

(57) ABSTRACT

The invention relates to electronic spectacles, in particular night vision spectacles (10), comprising an electronic camera (26) provided with a lens system and a CCD-sensor, an image processing unit (48) which processes the image received by the camera, and an output signal for a display means (28, 39) associated with each eye, said display means being used to reproduce the image, and a reproduction lens system (32, 34) which is arranged downstream from each display means (28, 30). The invention is characterised in that the camera (26), the display means (28, 30) and the reproduction lens system (32, 34) are synchronised in relation to each other such that the image which can be detected by a user, when in use, corresponds to real conditions relating to the represented dimensions without limiting the direct vision of the user.

17 Claims, 6 Drawing Sheets

ELECTRONIC SPECTACLES, IN PARTICULAR NIGHT VISION SPECTACLES

The invention pertains to electronic spectacles, especially to night-vision spectacles, of the type indicated in the introductory clause of Claim 1.

There is an increasing need for electronic spectacles, especially night-vision spectacles, for police surveillance purposes, for military operations, and also for sports and leisure-time activities. Such spectacles should be easy to use and light in weight, and it should be possible to use them even when the intensity of the light in the area to be observed changes significantly. With the help of night-vision spectacles, it should be possible to carry out activities at night with the same ease as during the day without the use of additional sources of light.

One type of night-vision spectacles is known from DE 38 06 940 A1, for example. In the case of these night-vision spectacles, low light levels in the form of moonlight or starlight are amplified by an image converter. These night-vision spectacles comprise, for each eye, an objective lens system, an image converter, and a display means. Each of the display means is provided with a lens, through which the image is seen. The image converter consists essentially of a cathode-ray tube, which amplifies the rays of the low available light and sends these amplified rays to the display means, where they can be seen through an eyepiece lens system.

Night-vision spectacles of this type suffer from the disadvantage that they require a high operating voltage. Taken together with the batteries and the cathode-ray tube, they are quite heavy. In addition, the quality of the image is quite limited. Details cannot be recognized. Their range of application, furthermore, is highly restricted because of their low sensitivity, being capable of operating only to a low-light level of 0.001 lux without supplemental lighting, which corresponds to an available light amplification of 30,000-40,000. There is also the additional problem that when a floodlight is turned on, for example, the sudden change in brightness blinds the user of the spectacles and renders him incapable of carrying out the intended activity.

A generic type of electronic spectacles, especially night-vision spectacles, is also known from DE 197 24 140 C2. These spectacles comprise an electronic camera with an objective lens system and a CCD sensor. These electronic spectacles also have an image-processing unit, which processes the image recorded by the camera and, to reproduce the image, sends an output signal to a display means assigned to each eye, each of these display means being provided with an eyepiece lens. These spectacles, however, are always operated in conjunction with a source of infrared light to improve the night-vision properties of the night-vision spectacles. For this purpose, the infrared light source is pulsed to achieve the highest possible efficiency at the lowest possible power consumption. A sensor is also provided, which controls the intensity of the infrared source as a function of the intensity of the available light.

This embodiment suffers from the relatively high power consumption, which leads to the need for large, heavy batteries or to short duty cycles. Another disadvantage, one which occurs especially when used in military deployments at night, is that the user of these night-vision spectacles can be easily detected by an enemy using appropriate spectacles which are sensitive to infrared light. The user thus becomes an easy target and is put in great danger.

All of the known spectacles, furthermore, suffer from the problem that the observed environment is not presented accurately. Spectacles of this type therefore make it very difficult for the user to orient himself and to move at night across the terrain. The known electronic spectacles do not make it possible to estimate distances accurately or to see in three dimensions; at best, their capacities in these respects are extremely limited.

The invention is therefore based on the task of improving electronic spectacles of the type indicated in the introductory clause of Claim 1 in such a way that, under avoidance of the disadvantages mentioned above, electronic spectacles optimized for various areas of application are created.

This task is accomplished by the characterizing features of Claim 1 in conjunction with its introductory features.

According to the invention, the camera, the display means, and the eyepiece lens are designed to work together in such a way that the displayed dimensions of the image which the user detects during use correspond to the real relationships which the user would see in a direct view without restriction. As a result, a person wearing the spectacles can execute even complicated activities, because the image which he sees corresponds to the real dimensions and relationships of the objects. In addition, the effect of at least a virtual 3D image is created, so that it becomes easier for the user to orient himself and to estimate distances.

According to an embodiment of the invention, when the user's eyes are in a certain base position, namely, a position corresponding to a straight-ahead view, the center axis of the display means, the optical axis of the eyepiece lens, and the associated axis of the user's eye are aligned concentrically with each other. The use of this simple measure guarantees that the image corresponds to the actual size relationships.

So that vision defects can be compensated, the position of the eyepiece lens of the display means in question is designed to be adjustable along the optical axis relative to the display means. In particular, the eyepiece lens system of one display means is designed to be adjustable independently of the eyepiece lens system of the other display means. Because individual vision defects can thus be corrected, both eyes will see a sharply focused image.

To optimize 3D vision, two cameras and two image-processing units, which are synchronized with each other with respect to the various image-processing steps, are provided for each display means. The optical axes of the cameras are preferably concentric to the axes of the user's eyes in the base position. By the use of this simple measure, therefore, accurate 3D reproduction is achieved.

According to an embodiment of the invention, the display means are mounted in a fixed carrier and supported so that they can be shifted laterally to align with the axes of the user's eyes. The carrier in turn is mounted permanently in the spectacle frame. As a result, the image is reproduced in correspondence with reality and in the appropriate size ratios and will not be distorted by displacement of the components with respect to each other within the overall arrangement.

The objective lens system and the image-processing unit are therefore also mounted in the carrier, so that the fixed carrier guarantees a predetermined interrelationship of all of the parts mounted on it.

Although the previously mentioned optical characteristics are advantageous in providing the most realistic possible display of the image, the following features, pertaining to the electronic circuitry, make it possible to improve the realism of the image display even more.

In particular, the camera and the image-processing unit are designed in such a way that the image which the user can see during use is displayed in real time.

Not only as a result of the method used to display the image but also as a result of the speed with which the image is displayed, the approximation of reality is therefore perfect or nearly perfect.

To obtain good image quality for night vision applications, the camera has a CCD sensor for the night vision range with a sensitivity for wavelengths in the range of 500-1200 nm. As a result, the range of potential applications is significantly expanded, especially to applications working in the high-infrared range.

According to an embodiment of the invention, the camera is designed to work at available light levels of less than 0.001 lux, especially at levels of 0.0002 lux, without the need for additional lighting.

To improve image quality, the CCD sensor is provided in particular with an image resolution of at least 790×590.

Because the image quality of black-and-white displays is much higher, the display means is designed to display black-and-white images, especially to display images in 256 shades of gray.

Image quality can be improved even more by providing the image processing unit with a digitized preamp stage, which removes noise and interference from the signal coming from the camera, especially from signals in the high-infrared range, i.e., at wavelengths of 650-1200 nm.

The preamp stage can be followed by, for example, a digital/analog converter, so that the signal can then be subjected to further processing as an analog signal at the standard level of 1 V peak-to-peak (=PAL level).

To guarantee clean signal processing and readout, the image-processing unit preferably has two series-connected analog amplifier stages and a control voltage circuit, which calibrates the amplifier stages to zero each time an image pixel is read out—in line-by-line fashion, for example—from the CCD sensor of the camera. The noise components are suppressed even more as a result.

The amplifier stages are provided with a signal amplification of more than 25 dB, especially of 52 dB, versus the standard level.

It is also advantageous for the amplifier stages to have an external circuit which is optimized with respect to design and scaling to handle the amplification and transmission of signals carrying black-and-white image data.

In particular, the amplifier stages are provided with a closed-loop controller for the range of 5-52 dB. When the brightness of the environment changes rapidly, this controller modulates the amplifiers in such a way that the image is not noticeably overexposed. In particular, the controller is designed to be activated manually.

This guarantees that unrestricted vision remains preserved under any lighting conditions. In certain areas of application, furthermore, it can be advantageous for the user to turn this controller off, so that he can detect when the lighting conditions change.

According to an embodiment of the invention, the amplifier stages are provided with a manually actuated open-loop controller, which the user can use to adjust the sensitivity of the amplifiers. In this way, the user can adjust the spectacles to the lighting conditions and/or to the intended purpose.

Each amplifier stage preferably contains a "sample-and-hold" circuit across a field-effect transistor to clamp the signal. These circuits are time-controlled as a function the arriving signal to achieve high sensitivity and to ensure that the amplifier stages operate in harmony with each other.

To improve image quality, image noise and the false-color components are eliminated or at least suppressed by installing at least two active signal filters in the form of bandpass filters downline from the digital/analog converter.

In particular, a signal buffer stage with an amplification function, especially by more than two versus the standard level, is provided downline from the active signal filters, so that losses arising from the preceding signal processing and signal transmission steps can be compensated and equalized.

According to an embodiment of the invention, a bandpass filter and a signal splitter for impedance matching are connected upline of the display means to ensure loss-free matching to the following electronic display circuitry.

The signal splitter works together with a signal processing unit, which ensures that the images displayed by the display means are in phase and synchronized with each other.

The display means are preferably AMLCD screens or FLLCD screens.

The electronic spectacles are connected to a voltage source, especially to a battery, so that they can be used in any location.

The battery is preferably accommodated in a battery housing, especially a separate housing, designed to be attached to the user's body.

According to an embodiment of the invention, the display means has an on-screen display for showing additional information pertaining to the displayed image. For example, information on the user's assignment, on the recognized terrain, and the like, can be superimposed on the main image.

In particular, a transmission and/or reception interface is also provided, by means of which the images visible to the user can be transmitted. The user's commanding offer, for example, could therefore receive the images at his command post and issue appropriate instructions in the form of an on-screen display to the user.

Additional advantages, features, and possible applications of the present invention can be derived from the following description in conjunction with the exemplary embodiments illustrated in the drawing.

The invention is described in greater detail below on the basis of exemplary embodiments shown in the drawing. The terms and associated reference symbols given in the attached list are used in the description, in the claims, in the abstract, and in the drawing. In the drawings:

Figure 1:
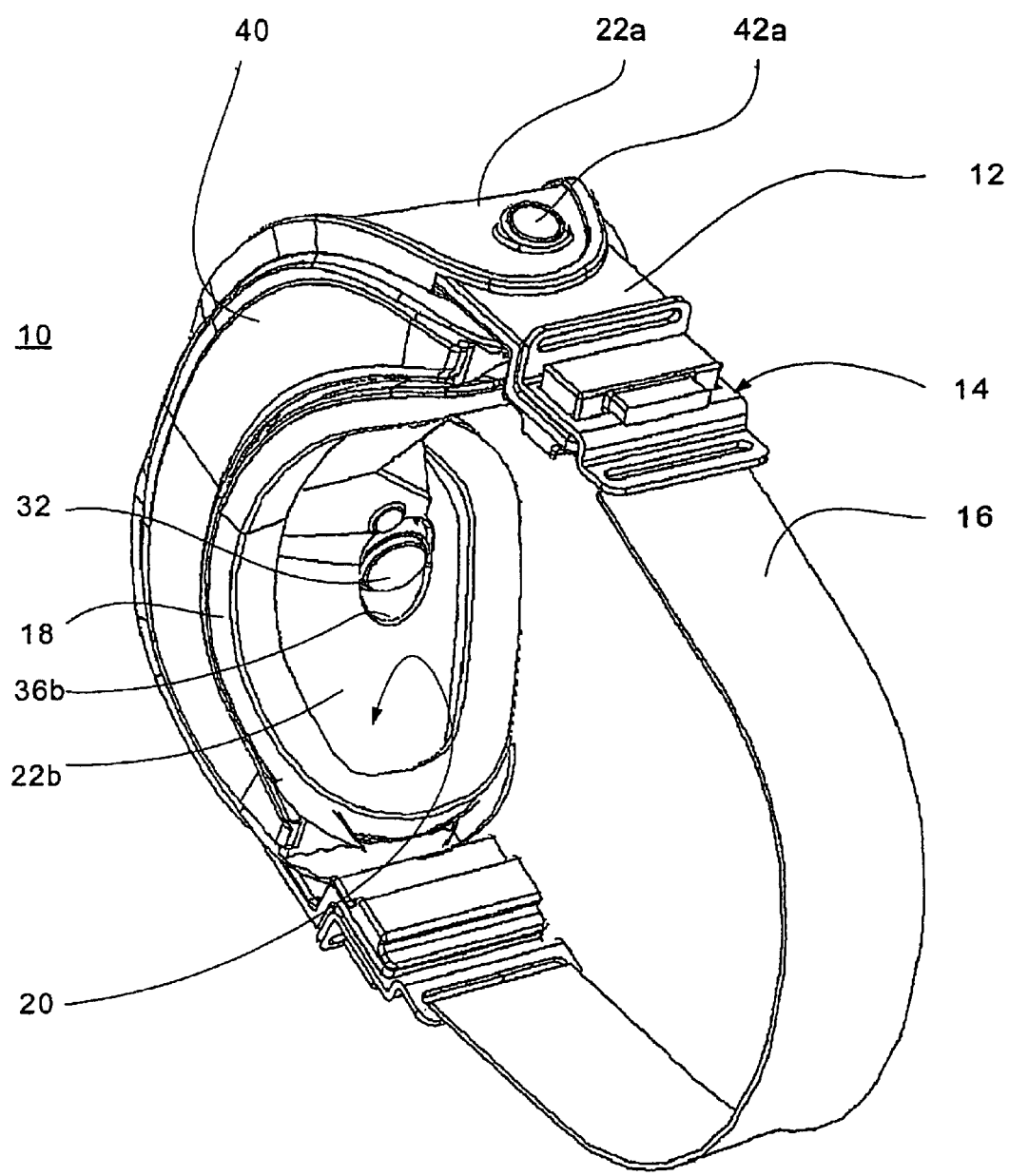
FIG. 1 shows rear view, in perspective, from slightly above and to the side, of a pair of night-vision spectacles according to an embodiment of the invention.

FIGS. 1-4 show various views of on embodiment of a pair of night-vision spectacles 10 according to the invention. The night-vision spectacles 10 consist of a spectacle frame 12, which is held in place, via the closure 14, by a fastening belt 16. The spectacle frame 12 is designed with cushioning pads 18 on the side facing the head of the user in the same way as the frames of safety spectacles or ski spectacles.

In the spectacle frame 12, an insert 20 is installed, which, on the side facing away from the head of the user, is covered by a protective wall 22a and on the side facing the user's head by a protective wall 22b. The insert 20 is permanently attached to the spectacle frame 12.

Figure 3:
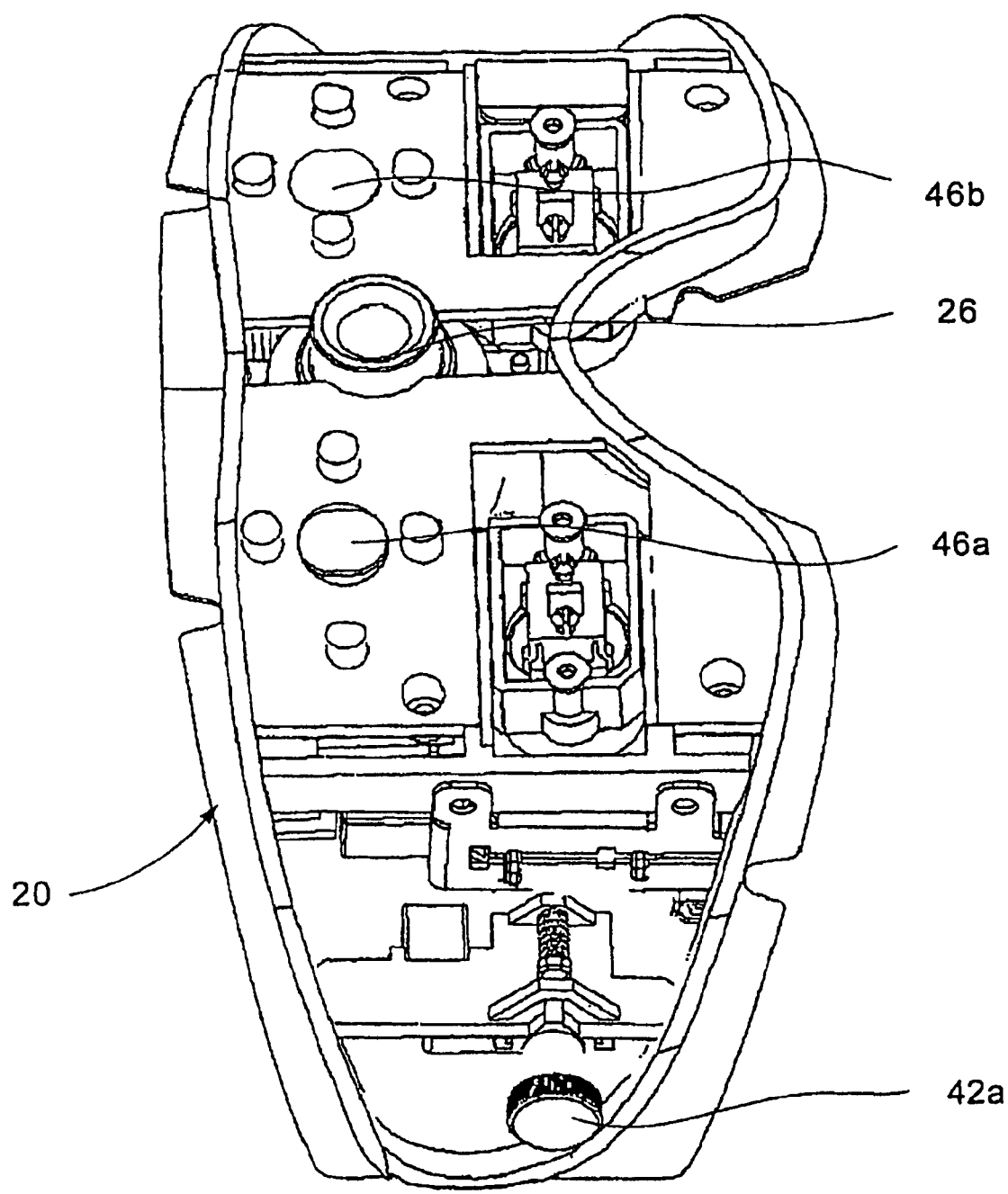
FIG. 3 shows a view, in perspective, of the use of the night-vision spectacles of FIG. 2 but without the outside wall.
Figure 4:
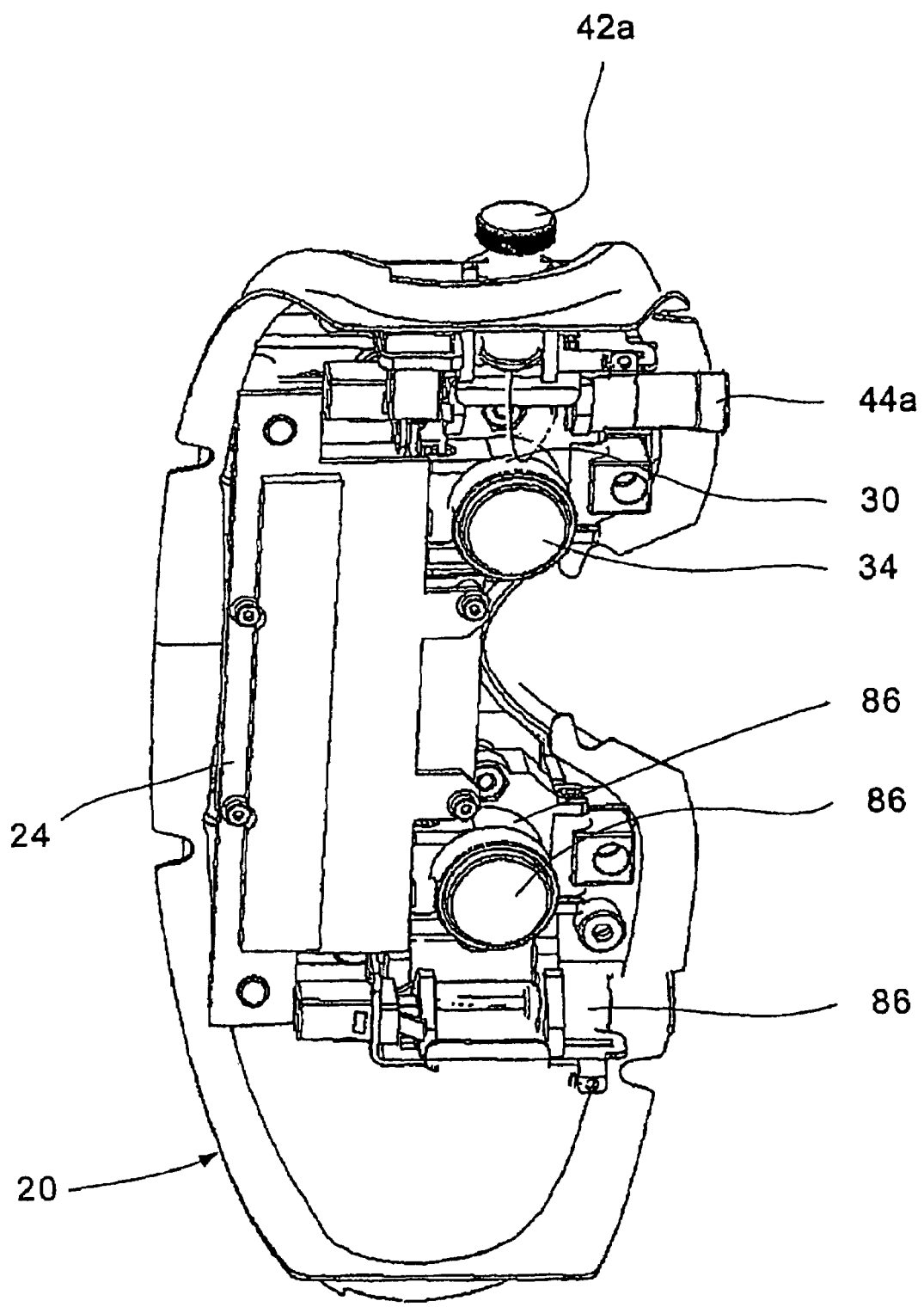
FIG. 4 shows a view, in perspective, of the use of the night-vision spectacles of FIG. 1 but without the rear wall.
Figure 5:
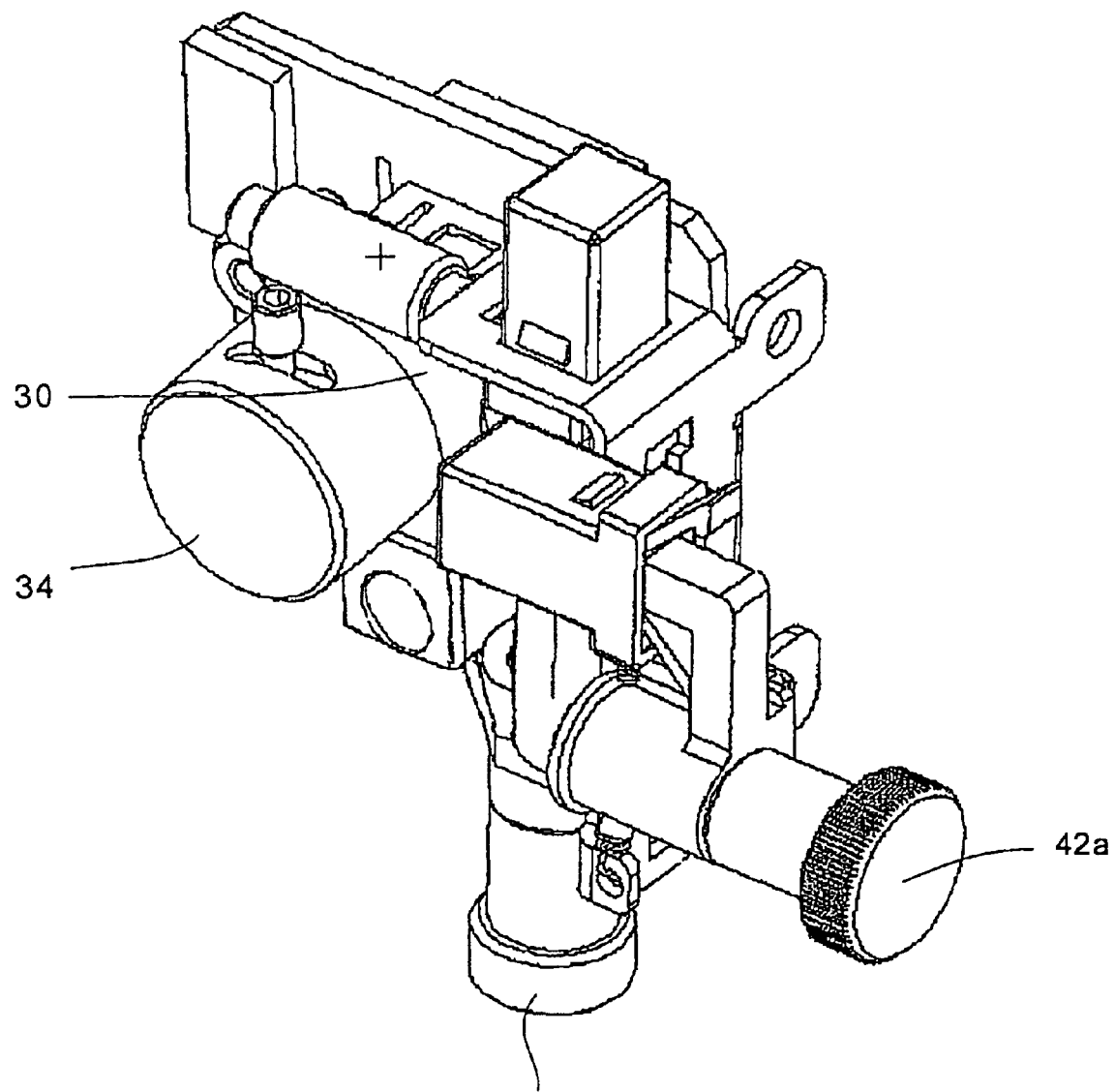
FIG. 5 shows a view, in perspective, of a detail of FIG. 4, to illustrate the adjustability of the eyepiece lens and of the display.

The insert 20 is shown in detail in FIGS. 3 and 4 and is provided with a support plate 24, to which all of the optical and electrical components are permanently attached.

A camera 26 and two displays 28—left—and 30—right—are mounted on the support plate 24. In addition, eyepiece lenses 32, 34, assigned to the displays 28, 30, respectively, are also mounted on the support plate 24.

Figure 2:
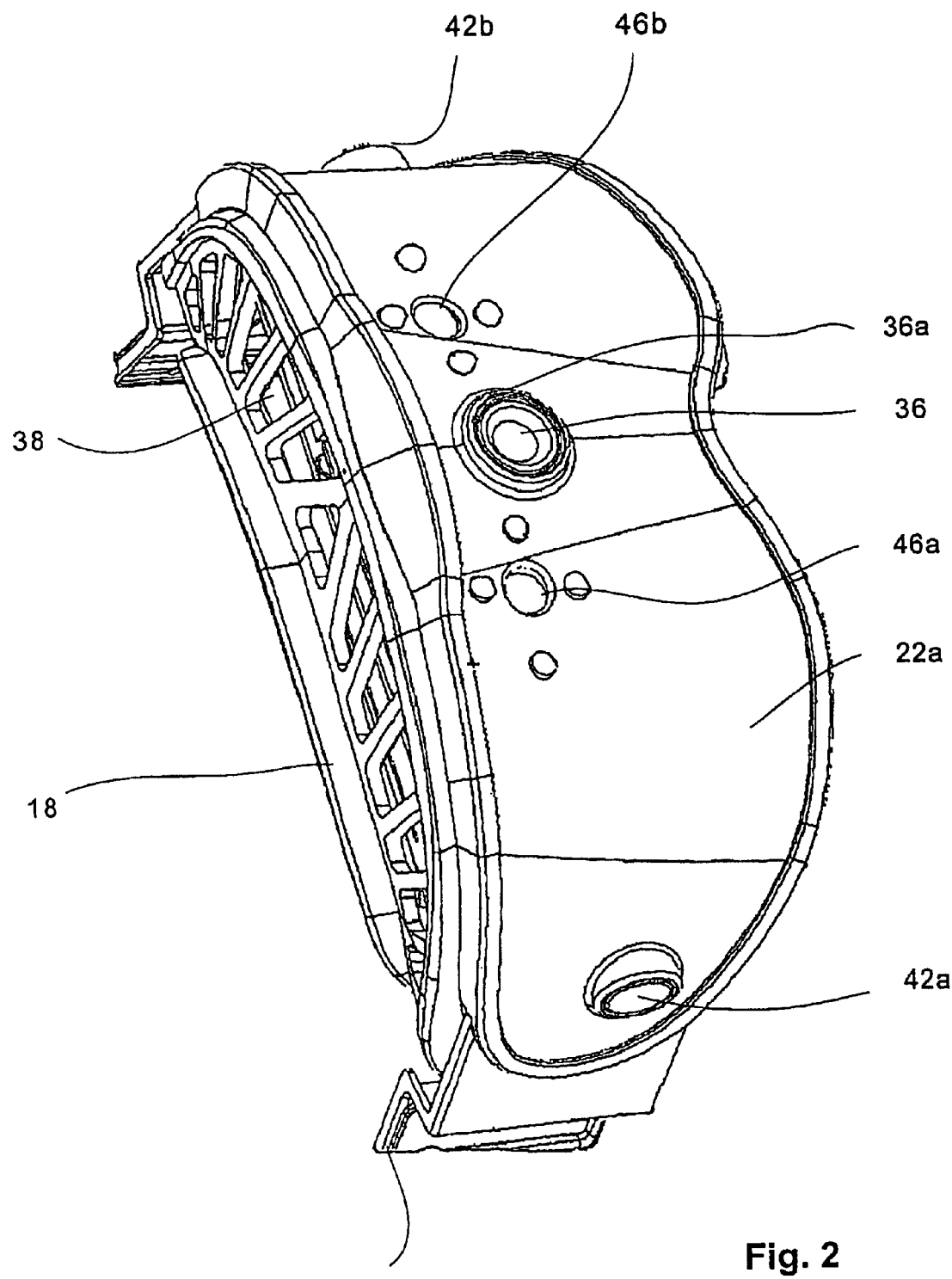
FIG. 2 shows a front view, in perspective, of the night-vision spectacles of FIG. 1.

The protective wall 22b has openings 36b and 36c for the eyepiece lenses, and the protective wall 22a has openings 36a for the camera (see FIGS. 1 and 2).

On the top side of the spectacle frame 12 are vent openings 38, which are covered by a permeable film 40. This guarantees that the heat generated by the electronic components can escape from the interior of the night-vision spectacles 10 to the outside through the vent openings 38 and the permeable film 40.

The camera 26, the displays 28 and 30, and the eyepiece lenses 32, 34 are designed to work together in such a way that that the dimensions of the image which the user sees during use correspond to the real relationships which the user would see in a direct without restriction. For this purpose, the eyepiece lens 32 is connected to the display 28 and the eyepiece lens 34 is connected to the display 30 in such a way that they can be shifted laterally with respect to each other in the support plate 24. By making use of the lateral displacement capacity, the interocular distance, which can differ from one user to another, can be adjusted so that, when the user's eyes are in a certain base position, namely, a position in which the user is looking straight ahead, the center axis of the displays 28, 30, the optical axes of the eyepiece lenses 32, 34, and the associated ocular axes of the user are concentric to each other. For this purpose, adjusting devices 42a, 42b are provided on each side of the insert 20 of the night-vision spectacles 10. So that, in addition, vision defects of the individual eyes of the user can also be compensated, additional adjusting devices 44a, 44b for the corresponding eyepiece lenses 32, 34 are provided, which can be used to shift the eyepiece lenses 32, 34 along their optical axes relative to the displays 28, 30. An individual eyepiece lens 32, 34 can be adjusted by the use of one of the additional adjusting devices 44a, 44b independently of the eyepiece lens 34, 32 of the other display 30, 28.

Figure 6:
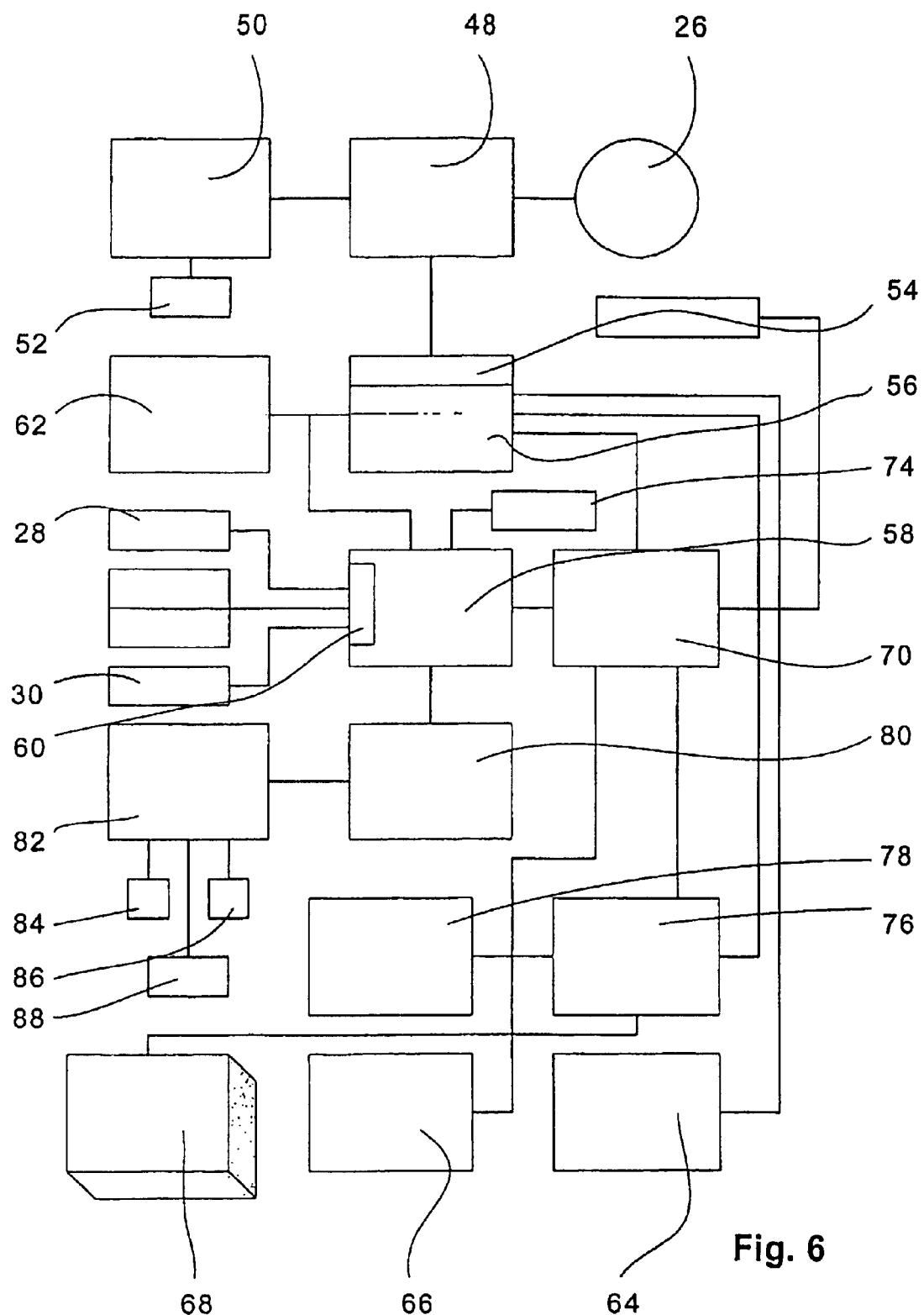
FIG. 6 shows a schematic circuit diagram, which illustrates how the signals are processed.

The night-vision spectacles 10 also have available light sensors 46a, 46b, which work together with an automatic control unit. This will be explained further below in conjunction with FIG. 6.

The camera 26 works together with an image processing unit 48. The camera 26 and the image-processing unit 48 are designed so that the image which the user of the night-vision spectacles can detect during use is displayed in real time. The camera 26 has a CCD sensor for the night vision range with a sensitivity for wavelengths at 500-1200 nm and is designed for available light levels of less than 0.001 lux, especially for 0.0002 lux, without the need for additional lighting. The CCD sensor also has an image resolution of at least 790×590.

The camera 26 is provided with an objective lens system (not shown here in detail) with fixed or adjustable lenses.

The image-processing unit 48 works together with an amplifier control unit 50, which can be turned on an off by means of an operating element 52. The image-processing unit 48 is provided with a digitized preamp stage, which removes noise and interference from the signal coming from the camera 26, especially in the near and high-infrared range, i.e., in the range of wavelengths from 650 to 1200 nm. The preamp stage is a followed by a digital/analog converter, so that the signal can then be further processed as an analog signal at the standard level of 1 V peak-to-peak (PAL level). The signal then passes through two series-connected analog amplifier stages in the image-processing unit 48. To ensure clean signal processing and readout, the amplifier stages have a voltage control circuit, which calibrates the amplifier stages to zero each time an image pixel is read out—on a line-by-line basis, for example—from the CCD sensor of the camera 26. Noise is also suppressed. The amplifier stages are provided with a signal amplification of more than 25 dB, preferably of 52 dB, versus the standard level.

The amplifier stages are provided with an external circuit, which, with respect to its design and scaling, is optimized for the amplification and transmission of signals containing black-and-white image data. A closed-loop controller for the range of 5-52 dB is assigned to the amplifier stages. This controller acts together with the available light sensors 46a, 46b in such a way that the amplifier stages are adjusted in correspondence with the intensity of the available light. The quality of the image which the user sees thus remains independent of the available light conditions.

The amplifier stages contain a "sample-and-hold" circuit built around a field-effect transistor to clamp the signal, which are time-controlled as a function of the arriving signal to guarantee high sensitivity and to ensure that amplifier stages work in harmony with each other. At least two active signal filters in the form of a bandpass filter 54 are connected downline from the image-processing unit 48 and thus also downline from the digital/analog converter of the image-processing unit 48. These filters improve the image quality by suppressing, at least, or even completely eliminating image noise and false-color components. A signal buffer stage 56 with an amplification function, especially by more than two versus the standard level, is connected downline from the active signal filters 54, so that losses from the preceding signal processing and signal transmission steps are compensated and equalized.

Another bandpass filter 58 and a signal splitter 60 for impedance matching are connected upline of the displays 28 and 30 to ensure loss-free matching to the following electronic display circuitry. The signal splitter 60 cooperates with a signal processing function, which ensures that the images in the displays 28, 30 are in phase and synchronized with each other.

The displays 28, 30 can be AMLCD or FLLCD screens based on liquid-crystal technology or ferrolyte technology, optimized for displaying images in black and white.

The night-vision spectacles 10 are connected to a voltage source, namely, to a battery 62. The battery 62 is accommodated in a separate battery housing, which can be fastened to the body of the user. Battery housings of this type are known, and there is therefore no need to describe them in detail here.

The night-vision spectacles 10 are provided with a transmission interface 64, a reception interface 66, and a serial interface 68. For inputs and outputs, the transmission interface 64 cooperates with the signal buffer stage 56, and the reception interface 66 cooperates with another signal buffer stage 70.

This signal buffer stage 70 cooperates with a video driver 72, which includes the bandpass filter 58. An operating element 74 can be used to adjust the contrast and the brightness of the display by way of the video driver.

The data for an OSD display in screens 28 and 30 can be superimposed onto the main image via the serial interface 68. For this purpose, the serial interface 68 works together with an OSD text generator 76. By way of a card reader 78, the user is identified and the OSD data for the assigned user are selected accordingly. In addition, an OSD data generator 80 for superimposing internal data can also be provided; this generator cooperates with a corresponding measurement data acquisition unit and the corresponding sensors 84, 86, 88. In this case, the sensors can include a sensor for the battery voltage, a light sensor, a gas sensor, a time display, etc.

The sensor 84 used to monitor the battery can actuate two LEDs, one of which monitors operation with brightness control, the other serving as an overvoltage detector, which gives a warning signal. Optionally, an acoustic warning buzzer can also be provided. The serial interface 68 can work together with a GPS system, with a wireless LAN system, etc.

The night-vision spectacles 10 according to the invention increase the ability to see in darkness. In particular, the night-vision spectacles 10 can also be used for leisure-time activities. As a result, sporting activities can be carried out in darkness. Cyclists, especially mountain bikers or cross-country touring cyclists, will find such spectacles especially suitable. They ability to see is not dependent on a source of illumination. The night-vision spectacles 10 are held firmly on the head by means of the fastening belt 16. As a result, the night-vision spectacles 10 easily accompany any movement of the head.

The spectacle frame 12 is designed to conform to the shape of the head, so that no interfering light can intrude into the interior from the outside.

The invention is characterized by its simple design and its realistic display of the area being observed.

LIST OF REFERENCE NUMBERS

10 night-vision spectacles
12 spectacle frame
14 closure
16 fastening belt
18 cushions
20 insert
22a protective wall, front
22b protective wall, rear
24 carrier plate
26 camera
28 display—left
30 display—right
32 eyepiece lens—left
34 eyepiece lens—right
36a opening for the camera
36b opening for the eyepiece lens—left
36c opening for the eyepiece lens—right
38 vent openings
40 permeable film
42a adjusting device—right
42b adjusting device—left
44a additional adjusting device—right
44b additional adjusting device—left
46a available light sensor—right
46b available light sensor—left
48 image-processing unit
50 amplifier control
52 operating element
54 bandpass filter
56 signal buffer stage
58 bandpass filter and video driver
60 signal splitter
62 battery
64 transmission interface
66 reception interface
68 serial data interface
70 additional signal buffer for inputs and outputs
72 video driver and signal filter
74 operating element
76 OSD text generator
78 card reader
80 OSD data generator
82 measurement data acquisition
84 sensor
86 sensor
88 sensor

The invention claimed is:

1. Electronic spectacles, especially night-vision spectacles (10) comprising:
   an electronic camera (26) integrated into said spectacles as the primary recording means for the user of said spectacles, said camera being provided with an objective lens and a CCD sensor;
   an image-processing unit (48) connected downline from said camera (26) electronically processes an image recorded by said camera (26) and sends an output signal to display means (28, 30), one of which is assigned to each eye, for reproduction of an image;
   an eyepiece lens (32, 34), one of which is connected downline from each display means (28, 30);
   said image-processing unit includes a digitized preamp stage which removes noise and interference in the near-infrared range approximately at wavelengths of 650-1200 nm from said signal coming from said camera (26);
   said preamp stage is followed by a digital/analog converter, said signal subjected to further processing as an analog signal at the standard PAL level of 1V peak-to-peak;
   said camera (26), said image-processing unit, said display means (28, 30), and said eyepiece lens (32, 34) generate a displayed image which accurately represents in real time relationships and accurate dimensions of objects which the user would see in a direct view without restriction.

2. Electronic spectacles according to claim 1, characterized in that, when the user's eyes are in a certain base position, namely, a position corresponding to a straight-ahead view, the center axis of the display means (28, 30), the optical axis of said eyepiece lens (32, 34), and the associated axis of the user's eye are aligned concentrically with each other.

3. Electronic spectacles according to claim 1, characterized in that, to guarantee that the user will see a sharp image, each of said eyepiece lenses (32, 34) of each of said display means (28, 30) is independently adjustable along the optical axis relative to each said respective display means (28, 30).

4. Electronic spectacles according to claim 1, characterized in that each display means (28, 30) is provided with two cameras (26) and two image-processing units (48), the processing steps of which are synchronized with each other.

5. Electronic spectacles according to claim 4, characterized in that the optical axes of the camera (26) are concentric to the ocular axes of the user in the base position.

6. Electronic spectacles according to claim 1, characterized in that the display means (28, 30) are mounted in a fixed carrier (24) and are supported so that they can shift laterally in the carrier (24) with respect to the orientation of the ocular axes, where the carrier (24) is fixed in place in the spectacle frame (12).

7. Electronic spectacles according to claim 6, characterized in that the objective lens and the image-processing unit (48) are mounted in the carrier (24) in such a way that the fixed carrier (24) ensures that all of the parts mounted on the carrier (24) are in a predetermined relationship to each other.

8. Electronic spectacles according to claim 1, characterized in that the camera (26) has a CCD sensor for the night-vision range with a sensitivity for wavelengths in the range of 500-1200 nm.

9. Electronic spectacles according to claim 1, characterized in that the camera (26) is operable at light levels of less than 0.001 lux, especially for a level of 0.0002 lux.

10. Electronic spectacles according to claim 1, characterized in that the CCD sensor has an image resolution of at least 790×590.

11. Electronic spectacles according to claim 1, characterized in that the display means (28, 30) is designed for black-and-white images, especially for the display of 256 shades of gray.

12. Electronic spectacles according to claim 1, characterized in that the image-processing unit (48) has two series-connected analog amplifier stages and a control voltage circuit, which calibrates the amplifier stages to zero each time an image pixel is read out on a line-by-line basis from the CCD sensor of the camera (26).

13. Electronic spectacles according to claim 12, characterized in that the amplifier stages provide a signal amplification of more than 25 dB, especially of 52 dB, versus the standard level.

14. Electronic spectacles according to claim 12, characterized in that the amplifier stages have an external circuit, which, with respect to its design and scaling, is optimized for the amplification and transmission of signals containing image data in the black/white range.

15. Electronic spectacles according to claim 12, characterized in that the amplifier stages are provided with a closed-loop controller for the range from 5 to 52 dB, which modulates the amplifiers during rapid changes in brightness in such a way that the image is not noticeably overexposed, where in particular the controller is designed to be activated manually.

16. Electronic spectacles according to claim 12, characterized in that the amplifier stages are provided with a manually actuated open-loop controller, which the user can use to adjust the sensitivity of the amplifiers and adapt to the prevailing lighting conditions.

17. Electronic spectacles according to claim 1, characterized in that, to improve the quality of the image, at least two active signal filters in the form of bandpass filters (54) are connected downline from the digital/analog converter, which filters and reduces image noise.

* * * * *